Patented Sept. 11, 1928.

1,683,864

UNITED STATES PATENT OFFICE.

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS.

RUBBER COMPOSITION AND PROCESS RELATING THERETO.

No Drawing.   Application filed October 22, 1926. Serial No. 143,519.

The invention relates to an improvement in rubber compositions and especially to a rubber composition containing glue.

Glue has been used for many years in rubber compositions. The mixing or compounding of glue with rubber has its advantages especially for a product requiring stiffness that prevents distortion under load or pressure conditions with increased wear-resisting qualities. The disadvantages resulting from the use of glue with rubber, however, outweigh its advantages for the reason that the glue owing to its large particle size tends to laminate or build up in layers in the rubber or rubber composition and this lamination results in excessive tearing of the rubber especially under conditions where the rubber is subjected to rough usage as in the treads of tires.

The mixing of glue and rubber has usually been accomplished by the making of a so-called master batch, the master batch usually consisting of 50 per cent by weight of smoked sheet or crude rubber to which has been added 50 per cent by weight of glue. The union of the rubber and glue is effected by adding a percentage of water to the glue in order to soften it. In this softened condition the glue is worked into the rubber and after incorporation the mass is allowed to rest for about 24 hours. It is then placed on a hot mill and milled for a short period of time to remove the excess moisture. In this condition a master batch can be worked into any rubber compound without any further addition of moisture. This is the preferred method and the one that has given the best results in rubber mixes, but it is understood by those who have used glue that even when glue is well dispersed according to this method it will laminate owing to its large particle size,—that simple dispersion of glue does not change the particle size.

The essential object of the invention is to overcome the difficulties above referred to and to provide a rubber composition containing glue in which the reinforcing action of the glue is materially increased and its tendency to laminate substantially eliminated; to provide also a rubber composition possessing extreme stiffness which prevents distortion under load or pressure conditions with retained elasticity and a very high wear-resisting quality.

I have found that the objects of my invention may be attained if hydrolyzed keratin be mixed with the glue, the action being for the keratin to carry the glue into the rubber in a very finely subdivided form or particle size. The glue and hydrolyzed keratin are combined before being added to the rubber. Such combination is effected by mixing the glue in solution with the hydrolyzed keratin, and they are preferably combined in about equal parts as this gives the best results. The combined glue and keratin, either in dry or wet form, is then incorporated with the rubber in the making of a master batch, which is used in subsequent rubber compounds, in the usual way. When applied in dry form the mixing of the combined glue and keratin with the rubber can best be accomplished according to the improved process of mixing soluble fillers with glue which forms the subject-matter of my Letters Patent No. 1,640,818 of August 30, 1927 and in which the rubber and filler during the mix is sprayed with a light mist or nebula of moisture.

The keratin derivative used in this connection like that referred to in my co-pending application Serial No. 143,518, is that obtained by the hydrolytic decomposition of keratin to the point of obtaining soluble and diffusible cleavage products but preferably short of such hydrolytic decomposition as will form amino-acids, though some may be present, and preferably also those soluble and diffusible cleavage products obtained by the hydrolytic decomposition of keratin through the influence of heat and pressure by steam.

The process as practised by me for obtaining the hydrolyzed keratin is as follows: The keratin obtained from any source is first placed in a closed digester. Hydrolytic decomposition is effected by admitting steam to the digester. Steam admitted at 100 pounds pressure for approximately two hours has been found to be ample in connection with the keratin obtained from young animals. With the older keratin, however, it is desirable to carry on the digesting process for a longer period of time as for example even up to six hours. The process can be hastened, however, by increasing the steam pressure or superheating the steam.

While a large quantity of the keratin derivative may be obtained during the time periods above noted, yet if it is desired to convert substantially all of the keratin which may be contained in the digester, then the period of digestion may be further prolonged even up to 15 or 18 hours. When the treatment is thus prolonged and especially when keratin of a miscellaneous type is being treated in large quantities at one time, such as 15,000 to 20,000 pounds or more, it is desirable that the soluble cleavage products be removed at intervals rather than make one long digestion to prevent the first fraction of cleavage products formed from hydrolyzing through into the amino-acid group, although at times some may be present. For example, in such case steam might first be admitted to the digester at 125 pounds pressure for about eight hours, the steam then shut off, pressure on the digester relieved and the soluble products then drawn off and digestion continued for a further period of six hours, steam again shut off, the digester relieved and the soluble products again removed. Should the steam pressure show a material drop during the first or second period of digestion or the keratin prove especially refractory, it might be necessary to repeat the digestion for a third time for a period of from four to six hours.

At the expiration of the hydrolyzing process the material drawn off is passed through any suitable filter, evaporated to a consistency of from preferably 50 to 75 per cent solids, and then reduced to dry form and pulverized as desired.

The keratin, the cleavage products from the hydrolytic decomposition of which are used in the present connection, may be derived from any suitable source. As previously noted, the combined glue and hydrolized keratin may be mixed with the rubber in substantially the same proportions as was the glue alone, this being largely within the province of the rubber worker, depending upon the particular product desired to be obtained.

Having thus fully described my invention, I claim and desire to secure by Letters Patent of the United States:—

1. A rubber composition comprising rubber having compounded with it glue and soluble and diffusible cleavage products obtained by the hydrolytic decomposition of keratin, and which cleavage products are substantially short of amino-acids.

2. A rubber composition comprising rubber having compounded with it glue and soluble and diffusible cleavage products obtained by the hydrolytic decomposition of keratin, which cleavage products are substantially short of amino-acids and which glue and cleavage products of keratin have been combined in solution before being compounded with the rubber.

3. The process of forming a glue "mix" with rubber which comprises the addition to the rubber of glue previously combined in solution with hydrolyzed keratin and afterward mixing the glue and hydrolyzed keratin thus combined with the rubber by known methods of mixing.

CHARLES H. CAMPBELL.